Aug. 2, 1932.    W. SHAKESPEARE, JR    1,869,441
FISHING REEL
Filed April 7, 1930

INVENTOR
William Shakespeare Jr.
BY Chappell & Earl
ATTORNEYS

UNITED STATES PATENT OFFICE

WILLIAM SHAKESPEARE, JR., OF KALAMAZOO, MICHIGAN, ASSIGNOR TO SHAKESPEARE COMPANY, OF KALAMAZOO, MICHIGAN

FISHING REEL

Application filed April 7, 1930. Serial No. 442,068.

The main object of this invention is to provide in a fishing reel having a sheet metal casing an improved line guide eye which presents a rounded wear surface to the line and also provides a finish for the reel.

A further object is to provide a structure having these advantages which while very economical in parts and assembly, results in a highly desirable structure.

Objects relating to details and economies of my invention will appear from the description to follow. The invention is defined and pointed out in the claims.

A structure which is a preferred embodiment of my invention is illustrated in the accompanying drawing, in which.

Figure 1:
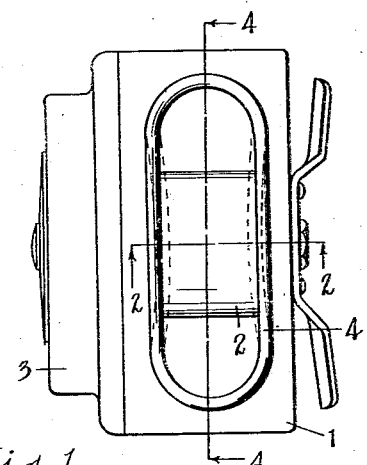
Fig. 1 is a side view of my improved fishing reel.
Figures 3, 4:
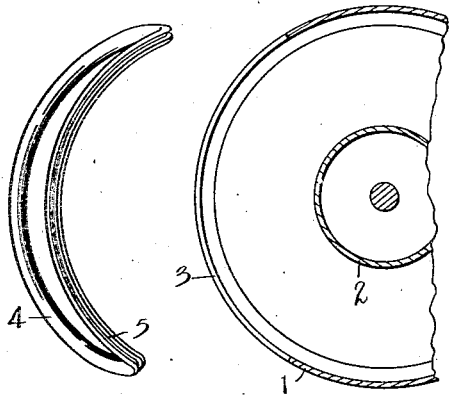
Fig. 3 is a perspective view of the line guide eye.
Fig. 4 is a fragmentary sectional view on line 4—4 of Fig. 1, the line guide eye being omitted.
Figure 2:
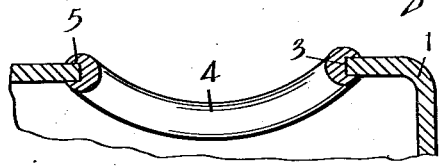
Fig. 2 is an enlarged fragmentary section on a line corresponding to line 2—2 of Fig. 1.

Referring to the drawing, the casing 1 is preferably formed of sheet metal. The reel illustrated in Fig. 1 is of the spring wind type such as shown in Letters Patent issued to Samuel G. Russell October 7, 1924, No. 1,510,904. The patent is of the automatic or spring wind type, the spool 2 being driven by a spring. The casing is formed with an elongated peripheral opening 3 having substantially straight side edges and curved ends.

The elongated endless guide eye 4 is of a shape corresponding to the opening 3 and is longitudinally curved to correspond to the curvature of the wall of the casing. This line guide eye is of round cross section and has a continuous groove 5 in its outer side engaging the edges of the opening of the casing, the line guide eye being sprung into the opening and retained therein by its resilience.

In inserting the eye in the frame, one curved end is engaged with the curved end of the opening and pushed down to engage the groove. The sides of the eye are then collapsed or drawn toward each other as indicated by dotted lines in Fig. 1; the other end may then be sprung into engagement with the end of the opening whereupon the sides of the eye are released, allowing it to snap or spring outwardly so that the eye is engaged throughout with the edges of the opening and is retained therein by its resilience.

Figure 5:
Fig. 5 is a fragmentary section corresponding to that of Fig. 2 of a slightly modified form or embodiment of my invention.

In the modification shown in Fig. 5, the groove 5 is not provided in the eye 6 but the edges of the opening have shallow grooves 7 therein into which the eye is sprung substantially as described for the embodiment shown in Figs. 1 to 4 inclusive, the eye being retained in engagement with the edges of the opening by its resilience.

Figure 6:
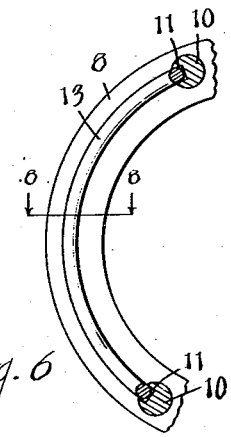
Fig. 6 is a fragmentary section corresponding to that of Fig. 4 of still another modification or adaptation of my improvements.
Figure 7:
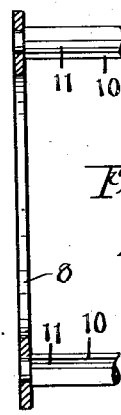
Fig. 7 is a fragmentary section of parts shown in Fig. 6.
Figure 8:
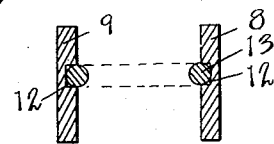
Fig. 8 is a fragmentary section on line 8—8 of Fig. 6.

In the embodiment shown in Figs. 6, 7 and 8, the frame comprises a pair of end members 8 and 9 connected by pillars 10. These pillars have longitudinal grooves 11 therein while the members 8 and 9 of the frame have curved grooves 12 therein corresponding to the longitudinally curved eye 13. This eye 13 is also endless and longitudinally curved, the grooves 11 and 12 of the parts of the frame being in effect grooves in the edges in the opening as shown in Fig. 5.

In practice, the casings 1 are preferably formed of an aluminum or other suitable alloy which may be readily drawn or stamped. The line guide eye however may be formed of material capable of witstanding wear or may be plated with chromium and thereby provided with a very hard wearing surface.

The line guide eye also has the advantage of providing an attractive finish for the opening and constitutes a reinforcing means for the edges of the opening.

I have illustrated and described my improvements in certain practical embodiments thereof. I have not attempted to illustrate or describe other embodiments or adaptations as I believe this disclosure will enable those skilled in the art to embody or adapt my improvements as may be desired.

Having thus described my invention, what I claim as new and desire to secure by Letters Patent, is:

1. In a fishing reel, the combination of a cylindrical casing having a circumferential elongated peripheral opening having straight side edges and curved ends, a spool, and an elongated endless line guide eye of round cross section and curved longitudinally to correspond to the curvature of the casing and having a continuous groove in its outer side engaging the edges of the opening of said casing, said line guide eye being sprung into said opening and retained therein by its resilience.

2. In a fishing reel, the combination of a cylindrical casing having a circumferential elongated peripheral opening, a spool, and an elongated endless line guide eye curved longitudinally to correspond to the curvature of the casing and having a continuous groove in its outer side engaging the edges of the opening of said casing, said line guide eye being sprung into said opening and retained therein by its resilience.

3. In a fishing reel, the combination of a casing having a circumferential elongated peripheral opening, a spool, and an elongated endless line guide eye curved longitudinally to correspond with the curvature of the periphery of the casing sprung into said opening, one of the co-engaging parts being grooved to receive the other.

4. In a fishing reel, the combination of a casing having a circumferentially elongated peripheral opening, a spool, and an elongated endless line guide eye curved longitudinally to correspond with the curvature of the casing sprung into said opening and retained in engagement with the edges of the opening by its inherent resilience.

5. In a fishing reel, the combination of a frame having opposed grooved parts, and elongated longitudinally curved line guide eye sprung into and retained in said grooved parts by its resilience.

6. In a fishing reel, the combination of a frame, opposed line guide eye supporting parts, and an elongated longitudinally curved line guide eye sprung into and retained in engagement with opposed parts of said frame by its resilience.

In witness whereof I have hereunto set my hand.

WILLIAM SHAKESPEARE, Jr.